United States Patent
Greenwood (10) Patent No.: US 10,953,300 B2
(45) Date of Patent: Mar. 23, 2021

(54) HORSE RIDING TRAINING AID

(71) Applicant: William Ronald Greenwood, Cheshire (GB)

(72) Inventor: William Ronald Greenwood, Cheshire (GB)

( * ) Notice: Subject to any disclaimer, the term of this patent is extended or adjusted under 35 U.S.C. 154(b) by 204 days.

(21) Appl. No.: 14/777,148

(22) PCT Filed: Mar. 14, 2014

(86) PCT No.: PCT/GB2014/050801
§ 371 (c)(1),
(2) Date: Sep. 15, 2015

(87) PCT Pub. No.: WO2014/140621
PCT Pub. Date: Sep. 18, 2014

(65) Prior Publication Data
US 2016/0030827 A1    Feb. 4, 2016

(30) Foreign Application Priority Data

Mar. 15, 2013  (GB) .................................... 1304800

(51) Int. Cl.
*A63B 69/04* (2006.01)
*G09B 9/00* (2006.01)
*G09B 19/00* (2006.01)

(52) U.S. Cl.
CPC ............. *A63B 69/04* (2013.01); *G09B 9/00* (2013.01); *G09B 19/0038* (2013.01); *A63B 2220/52* (2013.01); *A63B 2244/24* (2013.01)

(58) Field of Classification Search
None
See application file for complete search history.

(56) References Cited

U.S. PATENT DOCUMENTS

| 4,988,300 A * | 1/1991 | Yamaguchi ............ A63B 69/04 280/1.201 |
| 5,429,515 A * | 7/1995 | Greenwood ........... A63B 69/04 434/247 |
| 6,210,167 B1 | 4/2001 | Nishiyama |
| 2006/0147887 A1 * | 7/2006 | Greenwood ........... A63B 69/04 434/247 |

(Continued)

FOREIGN PATENT DOCUMENTS

| DE | 3704150 A1 | 8/1988 |
| EP | 1475130 A1 | 11/2004 |

(Continued)

OTHER PUBLICATIONS

International Search Report for PCT/GB2014/050801 dated Sep. 4, 2014.
English-Language Abstract of DE 3704150A1.

*Primary Examiner* — James B Hull
(74) *Attorney, Agent, or Firm* — Daniel A. Tanner, III; James E. Golladay, II; TannerIP PLLC (57) ABSTRACT

A horse riding training aid is provided. The horse riding training aid includes a dummy horse and actuator means for controlling the fore and aft position of the dummy horse. The horse riding training aid further includes one or more guide and/or control components for generally restricting movements of the dummy horse in certain directions. Actuators are also provide in a form of one or more of fluid operated rams, hydraulic rams and electric motors.

21 Claims, 5 Drawing Sheets

(56) References Cited

U.S. PATENT DOCUMENTS

| | | | | |
|---|---|---|---|---|
| 2007/0287139 A1* | 12/2007 | Holm | .................. | A63B 69/04 |
| | | | | 434/247 |
| 2011/0275444 A1* | 11/2011 | Tirelli | .................. | A63G 19/20 |
| | | | | 472/97 |
| 2013/0045812 A1* | 2/2013 | Garner | .................. | A63G 19/20 |
| | | | | 472/97 |

FOREIGN PATENT DOCUMENTS

| | | |
|---|---|---|
| GB | 2450887 A | 1/2009 |
| GB | 2482269 A | 1/2012 |
| JP | 6-285201 A | 10/1994 |
| WO | 01/89649 A1 | 11/2001 |
| WO | 2009/096262 A1 | 8/2009 |

\* cited by examiner

HORSE RIDING TRAINING AID

The present invention relates to horse riding training aids and in particular, but not exclusively, to horse riding training aids for use in jump training.

Several types of horse riding training apparatus are known. However, they are generally for training for flat racing (e.g. GB 2450887A and GB 2380140A) or for polo (e.g. GB 2363993A). The existing horse riding training apparatus generally comprise a simulated a horse body movably mounted on a supporting framework. The horse body is movable with respect to the framework but the known means of displacing the simulated horse body with respect to the framework only allow a simulation of walking, trotting, cantering and galloping and consequently are not suitable for use in jump training.

It is an object of the present invention to provide a horse riding training aid which is suitable for use in jump training.

In accordance with the present invention, a horse riding training aid comprises a dummy horse and actuator means for controlling the fore and aft position of the dummy horse.

This allows improved simulation of jumping.

In use, the actuator means may be independently operable to control the fore and aft position of the dummy horse.

Preferably, the actuator means is configured to control the fore and aft position of the dummy horse along a horizontal axis or in a horizontal plane.

The horse riding training aid may further comprise a base portion, the actuator means extending between the base portion and the dummy horse.

The horse riding training aid may further comprise guide means for constraining the movement of the dummy horse.

The guide means preferably constrain the dummy horse to move in a fore and aft axis.

Preferably, the control means is configured to control the fore and aft position of the dummy horse along a horizontal axis or in a horizontal plane.

The guide means may comprise elongate guide means, e.g. tracks or runners. The dummy horse may comprise bearings configured to engage with and be guided by the tracks or runners.

The horse riding training aid may further comprise resiliently deformable means for supporting at least part of the weight of the dummy horse, e.g. a spring.

Preferably, the independently operable actuators comprise fluid operated rams, e.g. hydraulic rams.

The horse riding training aid may further comprise second guide means for constraining the movement of the dummy horse in a different direction or plane.

The second guide means may restrict or prevent pivoting of the dummy horse about a vertical axis.

In one embodiment, the independently operable actuators comprise electric motors.

Preferably, the electric motors are servomotors.

The output of each of the electric motors may be connected to the dummy horse by means of a crank arm.

Preferably, the horse riding training aid comprises a connecting rod extending between the crank arm and the dummy horse.

In a preferred embodiment, there are two of said electric motors.

In one embodiment, the dummy horse is pivotally mounted about a fore-aft axis and further comprises means for pivoting the dummy horse about the fore-aft axis.

The dummy horse may comprise upper support means pivotally mounted to lower support means and means for pivoting the upper support means with respect to the lower support means.

The means for pivoting the upper support means with respect to the lower support means preferably comprises an electric motor.

Preferably, the electric motor has a rotary output and a crank arm is connected to the rotary output.

Preferably, the end of the crank arm is pivotally connected to the upper support means.

This allows the vertical position of the dummy horse to be adjusted thereby allowing simulation of jumping in contrast to the prior art.

There may be, for example, from two to six independently operable actuators.

The horse riding training aid may further comprise a base portion, the actuators extending between the base portion and the dummy horse.

The horse riding training aid may further comprise a pivotally mounted portion and flexible drive means for pivoting the pivotally mounted portion.

The horse riding training aid may comprise a body portion, a neck portion and a head portion pivotally mounted with respect to the neck portion, the flexible drive means being adapted to pivot the head portion with respect to the neck portion.

The neck portion may be pivotally mounted with respect to the body portion.

Preferably, the flexible drive means extends between the body portion and the head portion.

The horse riding training aid also preferably comprises a source of movement (e.g. a motor) connected to the flexible drive means.

The flexible drive means may comprise a flexible sheathed cable drive, e.g. a Bowden cable.

The horse riding training aid may further comprise stirrups connected to the body portion and means for measuring the force applied to the stirrups.

Preferably, sensor means are located between the body portion and the stirrups.

The sensor means may comprise a strain gauge, pressure sensitive resistor or load cell.

Preferably, the horse riding training aid further comprises a body portion, a neck portion and a head portion, the neck portion being pivotally mounted with respect to the body portion, and means for pivotally turning the neck portion either left or right in response to a sensed signal.

Further preferably, the neck portion further comprises an internal collar having a pair of opposing pivots positioned thereon.

In use, the neck portion may be pivoted left or right around the pair of opposing pivots under the control of an electric motor.

Preferably, a flexible drive means extending between the electric motor and the internal collar.

Further preferably, the flexible drive means comprises a connecting rod, at least one universal joint and rotational bearing.

In use, the sensed signal may be generated by a pair of head sensors disposed on either side of the head portion.

Preferably, the pair of head sensors are strain gauges that are differentially connected such that a difference signal is obtained.

Further preferably, the difference signal controls the electric motor.

Also according to the present invention there is provided a method for detecting the position and/or weight of a rider on a dummy horse, the dummy horse being controlled by a plurality of independently operable servomotors, the method comprising the steps of:

measuring at least one servomotor input voltage with no rider seated the dummy horse to generate a compensation signal;

measuring at least one servomotor input voltage with the rider seated the dummy horse to generate a rider response signal; and determining a load pattern by subtracting the received compensation signal from the received rider response signal, the load pattern being representative of the position and/or weight of the rider on a dummy horse.

Preferably, the method further comprises the step of displaying the load pattern to the rider.

It will be obvious to those skilled in the art that variations of the present invention are possible and it is intended that the present invention may be used other than as specifically described herein.

Specific non-limiting embodiments of the invention will now be described by way of example only and with reference to the accompanying drawings, in which:

FIG. 1b is a perspective view, partially cut away, of the horse riding training aid of FIG. 1a;

The horse riding training aid shown in the Figures comprises a simulated horse 10 (hereinafter referred to as a "dummy horse") mounted on an upper rectangular support plate 12a.

Figure 3:
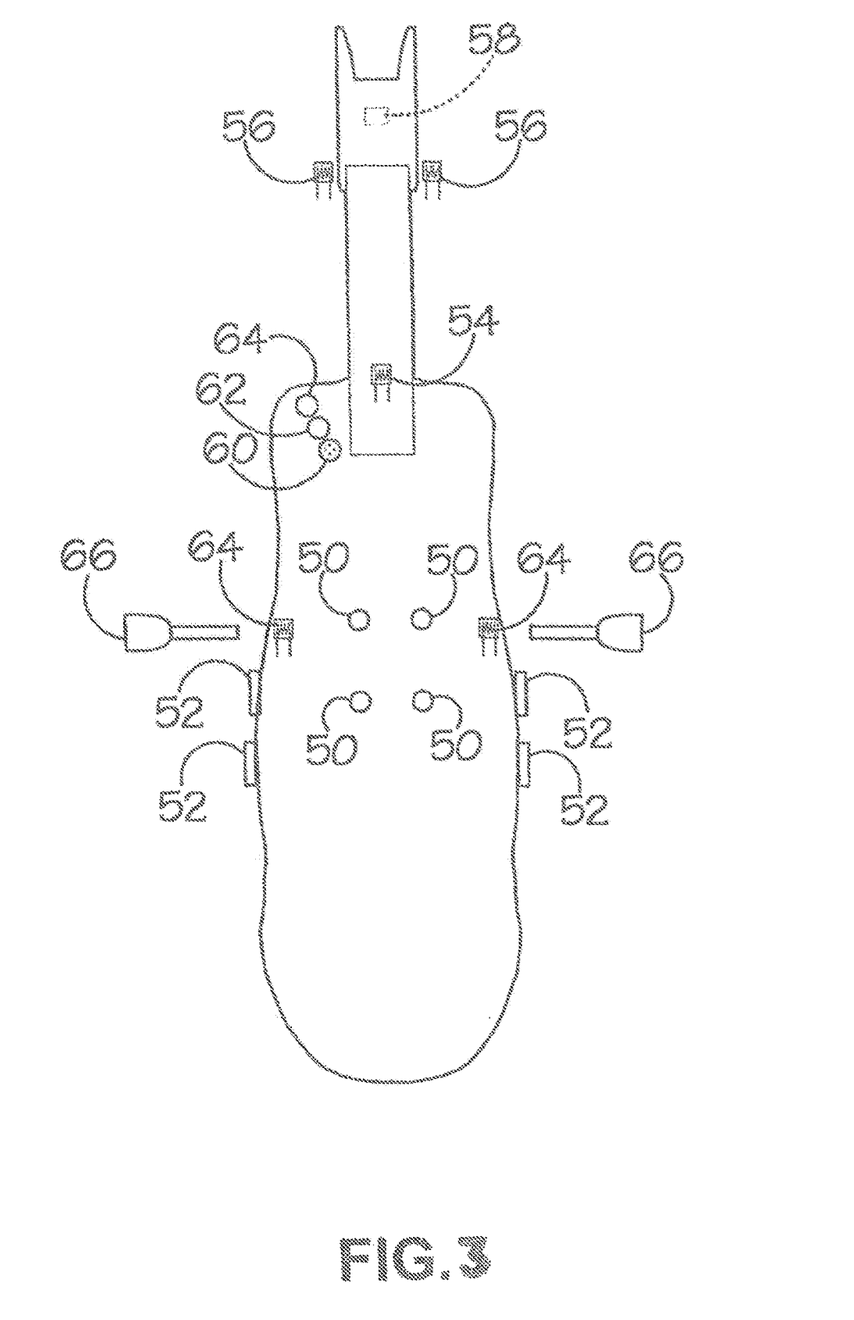
FIG. 3 is a view from above of the horse riding training aid of FIGS. 1a and 1b, illustrating the sensors which are responsive to rider input.

As illustrated in FIG. 3, the dummy horse is provided with numerous sensors connected to a computer 22 which in turn controls the movement of the dummy horse, as will be explained. The following pressure sensors are provided:

Four saddle sensors 50 on the upper surface of the dummy horse, in the region where a saddle is placed;

Two kick sensors 52 on each flank of the dummy horse;

A neck sensor 54 on the upper surface of the base of the neck portion 24;

Two head sensors 56, one located on either side of the head portion 36 for connection to reins (not shown);

A bit sensor 58 in a mouth region of the head portion 36, also or connection to reins.

An emergency stop button 60 and two buttons 62, 64 to increase and decrease the speed are also provided on the dummy horse adjacent to the lower end of the neck portion 24.

In addition, the horse riding training aid is provided with two stirrup sensors 64, one for each stirrup 66. The stirrup sensors 64 comprise electronic strain gauges mounted between the body of the dummy horse and the stirrups 66.

The various sensors described herein are provided as pressure sensors. This term is intended to cover not only simple sensors that produce a high/low output signal in response to the presence, or otherwise, of a certain pressure, force or position, but also other suitable transducers which take a mechanical input (such as pressure, force or position) and generate an analogue or digital output signal dependent on the input. Various sensors described herein can be provided as, but not limited to, strain gauges, pressure sensitive resistors, load cells, potentiometers, encoders, reflective/slotted optical switches, linear variable differential transformers (LVDTs).

By using sensors with a high degree of resolution, for example, those implemented as the saddle sensors 50, kick sensors 52, neck sensor 54 and/or stirrup sensors 64 on the back and flanks of the dummy horse it is possible to obtain a great deal amount of information about the position and balance of the rider, which, in turn, accurately controls the movement of the dummy horse. For example, pressure sensitive resistors can be used to assess the rider's leg pressure. This can be used when there is a need to differentiate between normal gentle leg pressure and then extra pressure to get the horse to react.

Another way to assess rider's balance is by positioning pressure sensitive resistors under the saddle, as the saddle sensors 50. In this way it is possible to sense balance in the saddle (left, right, front and back). Again this data can be used to trigger changes to the gait of the dummy horse.

Figure 1A:
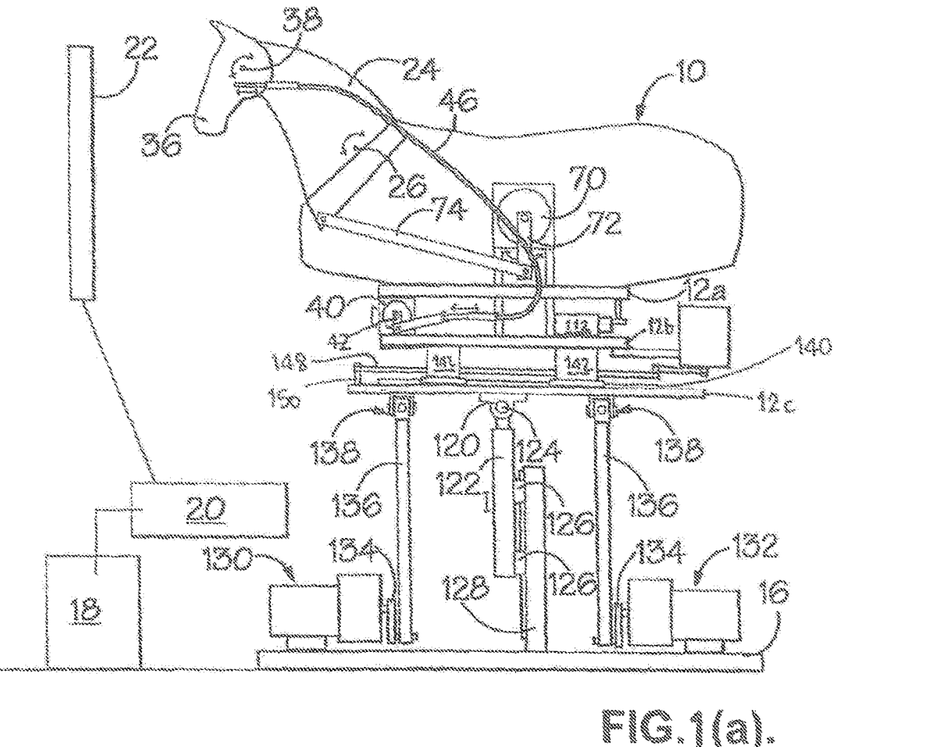
FIG. 1a is a side view, partially cut-away, of an embodiment of horse riding training aid in accordance with the present invention.
Figure 1B:
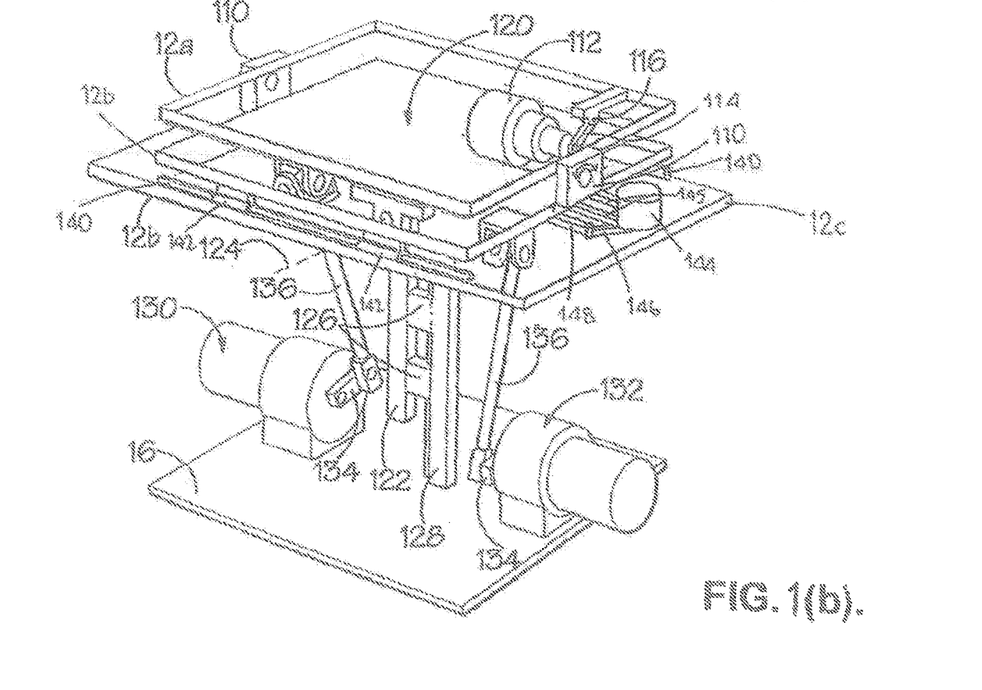

The upper support plate is itself pivotally mounted with respect to an identical intermediate support plate 12b by means of two mounting plates 110 welded to the centre of the two end edges of the upper support plate 12a and pivotally mounted to the centre of the corresponding edge of the intermediate support plate 12b. The upper support plate 12a can be made to pivot with respect to the intermediate support plate 12b by means of an electric "roll" motor 112 mounted between the two plates and secured to the upper surface of the intermediate support plate 12b. The output of the motor is connected to a crank arm 114, the outer end of which is pivotally connected at pivot 116 to the undersurface of the upper support plate 12a. The output of the motor is displaceable through a fixed angle. By rotating the motor output clockwise (as viewed in FIG. 1b), the upper support plate 12a is also rotated clockwise with respect to the intermediate support plate 12b as a result of the engagement of the crank arm 112 with the track. Conversely, by rotating the motor output anticlockwise (as seen in FIG. 1b), the upper support plate 12a can be pivoted anticlockwise with respect to the intermediate support plate 12b. By controlling the motor, left and right body roll of the dummy horse 10 mounted on the upper plate 12a can be induced.

The intermediate support plate is mounted above, and parallel to, a lower support plate 12c. The lower support plate is the same width as the upper and intermediate support plates 12a, 12b, but is longer than those plates and projects beyond each end of the upper and intermediate support plates 12a, 12b.

The upper face of the lower support plate 12c is provided with guides in the form of two elongate straight parallel tracks 140, each located adjacent to a respective one of the opposite lateral edges of the lower support plate 12c. As seen in the drawings, the undersurface of the intermediate support plate is provided with four linear bearings 142, two bearings 142 being located adjacent each lateral edge of the intermediate support plate 12b and being configured to run smoothly along the respective track 140.

Figure 2:
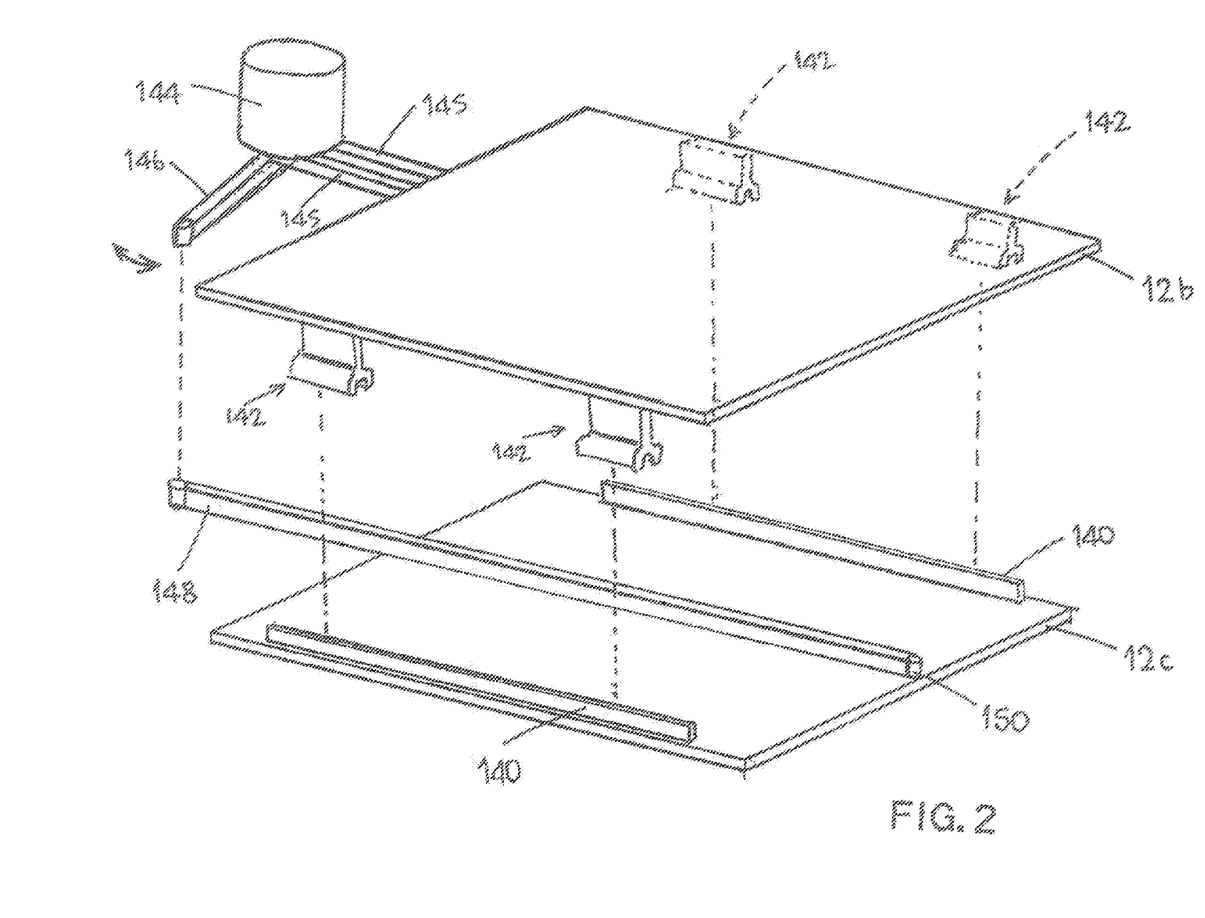
FIG. 2 is an exploded perspective view of the sliding portion of the horse riding training aid of FIGS. 1a and 1b.

A slider motor 144 is secured to the rear of the intermediate support plate 12b by means of mounting struts 145 secured to, and extending from the rear of, the intermediate support plate 12b. The output of the motor 144 is connected to a crank arm 146 which is in turn pivotally connected to one end of a connecting rod 148, the opposite end of the connecting rod being pivotally connected to the upper surface of the lower support plate 12c at a pivot 150 adjacent the front edge and midway between its lateral edges, as best seen in FIG. 2. Consequently, as the output of the motor 144 rotates the crank arm, in either direction, the intermediate support plate moves with respect to the lower support plate 12c, sliding forwardly and rearwardly along the tracks 140 of the lower support plate 12c along a horizontal axis (direction) or in a horizontal plane.

The undersurface of the lower support plate 12c is provided with a clevis 120 to which the upper end of a support post 122 is pivotally mounted about a substantially horizontal axis 124 running perpendicularly to the fore-aft direction of the dummy horse 10. The support post 122 is provided with two runners 126 or other linear bearings, which run in a track in a support column 128 rigidly secured to, and extending perpendicularly from, the upper surface of a base plate 16.

Also mounted on the upper surface of the base plate 16 are front and rear motors 150, 132. The output of each of the motors 130, 132 is connected to a crank arm 134 which is in turn rotatably mounted to one end of a push rod 136, the other end being secured to the undersurface of the lower support plate 12c by means of a universal joint 138, at a point midway between the two lateral edges of the lower support plate 12b. The two motors 130, 132 can be operated independently of each other (i.e. each one can be controlled individually). The motors 130, 132 are arranged to provide an output to displace the respective crank arm 134 through a predetermined angular range. By suitable operation of the motors in response to signals generated at the sensors on the dummy horse, the lower plate 12c (and therefore the dummy horse 10) can be moved vertically upwardly or downwardly, the vertical movement being guided by the engagement of the runners 126 of the support post 122 in the support column 128. Alternatively, or simultaneously, the motors 130, 132 may be operated by different amounts in order to tilt the intermediate support plate 12b rearwardly or forwardly about the horizontal axis of the clevis 120.

In this way, an extremely realistic jumping action can be simulated.

At the same time, the roll motor 112 located between the upper and intermediate support plates 12a, 12b can be operated in response to signals generated at the sensors on the dummy horse to induce a left or right body roll to the dummy horse, which improves the realism of the jumping action.

Moreover, operation of the slider motor 144 in response to signals generated at the sensors on the dummy horse causes the intermediate support plate 12b (and therefore the dummy horse 10) to move backwards and forwards (fore and aft) with respect to the lower support plate 12c (and therefore also with respect to the base plate 16), thereby further adding to the realism of the jumping action.

The three motors 112, 130, 132 are actuated by an actuating unit illustrated schematically at 18 which is under the control of the computer 20. The computer 20 is also arranged to display on a television screen 22 a simulated course to a rider mounted on the dummy horse 10. The computer 20 receives input from the sensors shown in FIG. 3 detecting the control movement of a rider mounted on the dummy horse 10 and depending upon the inputs the motors 112, 130, 132 are operated to control the movement of the dummy horse 10 and the computer 20 displays corresponding images on the screen 22.

A neck portion 24 of the dummy horse is pivotally mounted at pivot 26 to the body of the dummy horse. The neck portion 24 can be pivoted around pivot 26 by means of an electric motor 70 under the control of the computer 20, whose output is connected to the neck portion 24 by means of a crank 72 and a connecting rod 74 pivotally connected to the crank 72 and the neck portion 24 to give a reciprocal output which causes the neck portion to pivot.

A head portion 36 of the dummy horse is pivotally mounted at pivot 38 to the upper end of neck portion 24. The head portion 36 can be pivoted around pivot 38 by means of an electric motor 40 which transfers its rotary output motion to the head portion 36 by means of a crank 42 and a connecting rod 44 pivotally connected to the crank 42. The movement of the opposite end of the connecting rod 44 is transferred to the head portion 36 by means of a flexible drive means, in the form of a sheathed power transfer cable 46 (e.g. a Bowden cable).

Figure 4:
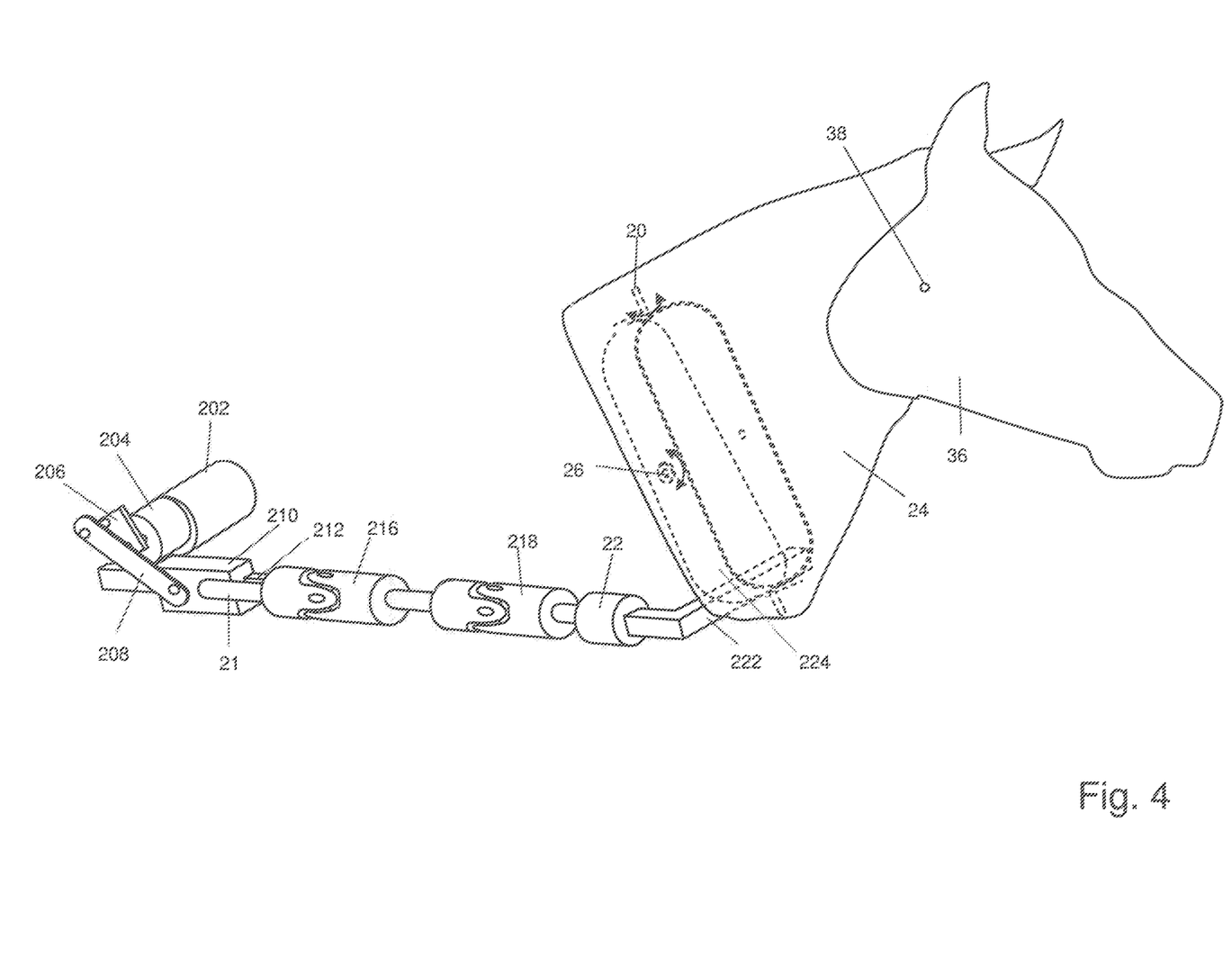
FIG. 4 is a close-up front side perspective view of a further aspect of the invention, which is to provide the horse riding training aid of FIGS. 1a and 1b with a powered pivoting neck portion so as to provide a more realistic horse riding motion.
Figure 5:
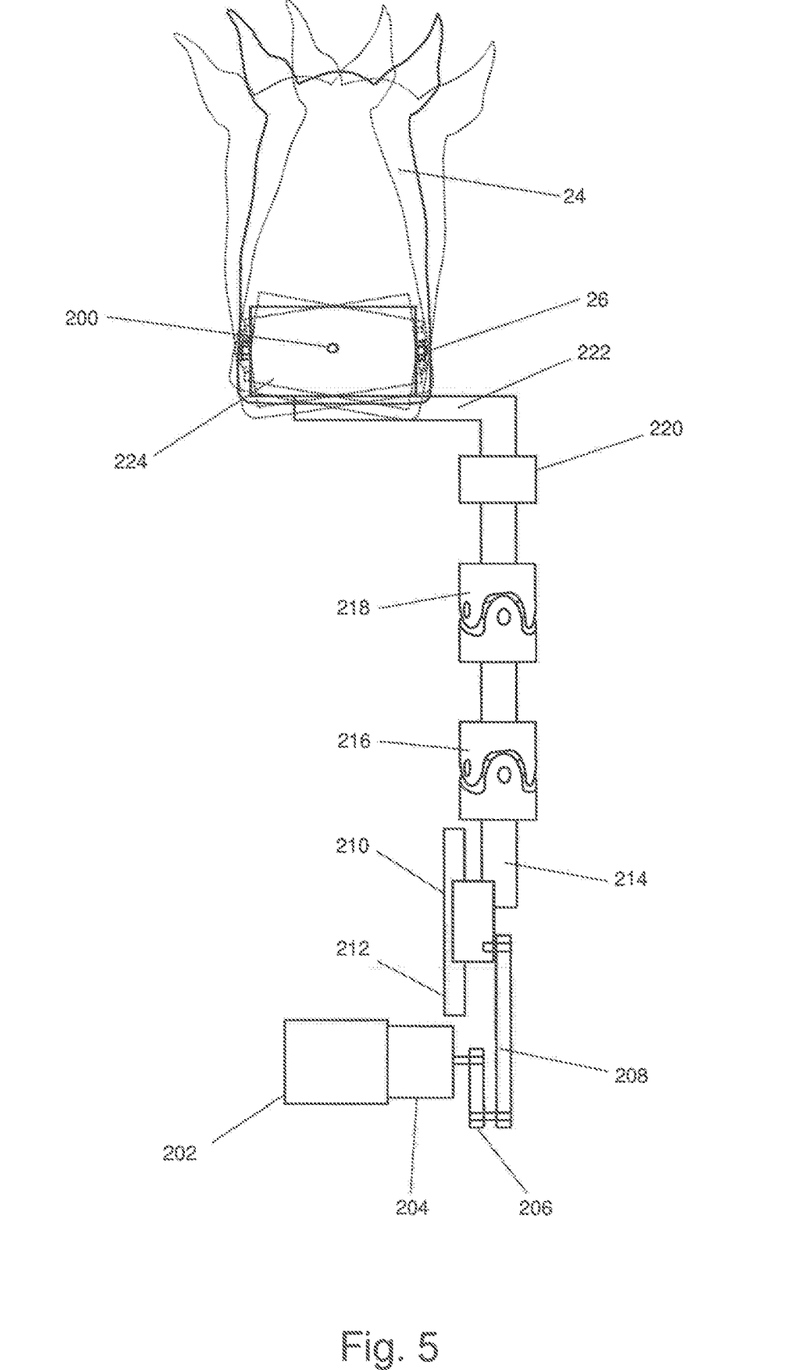
FIG. 5 is a close-sip view from above of the powered pivoting neck portion shown in FIG. 4.

FIGS. 4 and 5 show a further aspect of the present invention whereby the dummy horse can also be provided with a powered pivoting neck portion 24 that can be operated in response to signals generated at the head sensors 56 located on either side of the head portion 36. In this manner, the dummy horse can also be used as a dressage simulator that can perform both basic arena work and advanced dressage movements. In this way, the dummy horse of the present invention can be used as an eventing training aid capable of realistically simulating all three eventing disciplines; dressage, cross-country and show jumping.

FIGS. 4 and 5 show a mechanism for pivotally turning the neck portion 24 of the dummy horse either left of right in response to signals generated at the head sensors 56 (not shown in FIG. 4) located on either side of the head portion 36. As is best illustrated in FIG. 4, the upper end of the neck portion 24 is pivotally mounted at pivot 38 to the head portion 36. The neck portion 24 and head portion 36 are both dimensioned in size and shape to represent a horse's head. The lower end of the neck portion 24, which tapers outwards to meet the body portion, includes an internal collar 224 which has two orthogonally-positioned pivots located thereon. As described above, the neck portion 24 can be pivoted upwardly and downwardly around pivot 26. The internal collar 224 also includes a pair of opposing pivots 200 which are received in suitably dimensioned female receiving parts in the body portion (not shown).

The neck portion 24 can be pivoted left or right around pivot 200 under the control of a motor 202 that can be secured inside the body portion or to any of the upper 12a, intermediate 12b or lower support plates 12c by means of mounting struts (not shown). The skilled person will appreciate that to enhance intelligibility FIGS. 4 and 5 do not include many of the other features of the dummy horse as described in FIGS. 1a, 1b, 2 and 3.

The output of motor 202 is taken through a gearbox 204 which is than connected to a crank arm 206 which is in turn pivotally connected to one end of a connecting rod 208. The opposite end of the connecting rod 208 being pivotally connected to one end of a linear bearing 210 which is capable of sliding forwardly and rearwardly along a linear sliding rail 212. The other end of the linear bearing 210 is connected to an intermediate bar 214 which is connected to a pair of universal joints 216, 218 and to one surface of a rotational bearing 220. The effect of universal joints 216, 218 and rotational bearing 220 is to permit movement of the intermediate bar 214 in any direction, it is worth remembering that the dummy horse of the present invention permits movement both upwardly and downwardly, sliding forwardly and rearwardly and side-to-side body roll under the influence of the roll motor 112. The location of the motor 202 inside the dummy horse could conceivably subject to one or more of these motions relative to the end of the intermediate bar 214 and these motions can be compensated for by virtue of the universal joints 216, 218 and rotational bearing 220.

The other surface of the rotational bearing 220 is connected to an L-shaped arm 222 which is secured to the bottom of the internal collar 224. As shown in FIG. 5, by rotating the motor 202 output clockwise, the internal collar 224 is pivoted anticlockwise (towards the left when viewed and shown in dotted lines in FIG. 5) as a result of the engagement of the connecting rod 208 with the sliding rail 212. Conversely, by rotating the motor output anticlockwise, the upper support plate 12a can be pivoted clockwise (towards the right when viewed and shown in dotted lines in FIG. 5). By controlling the motor 202, left and right movement of the neck portion 24 can be adjusted.

Depending on the control exercised by the rider, as detected by the head sensors 56 as described above, the computer 20 controls the actuation of the motor 202 to adjust the position and movement of the neck portion 24 in response to the rider's control. The powered pivoting neck portion is particularly useful when the jumping simulator performs as a dressage simulator.

It allows the rider to pull on the reins, as detected by the strain gauges 56, and the difference and/or rate of change of difference between the measured strain gauge voltages is then used by the computer to output an appropriate drive signal to servomotor 202.

In use, the computer 20 generates an image of a course to be ridden and displays the course on the screen 22. The course will typically include one or more jumps which the rider of the dummy horse 10 has to negotiate. The rider controls the dummy horse in the same way as he or she would control a real horse, for example by use of reins, pressure on the neck, use of the stirrups, shifting the rider's weight in the saddle and kicking the flanks of the horse. Depending on the control exercised by the rider, as detected by the various sensors described above, the computer controls the actuation of the motors 112, 130, 132 to adjust the position and movement of the dummy horse in response to the rider's control. Depending upon the control exercised by the rider, the computer 20 will also determine, for example, whether a jump has been successfully negotiated and will display that information to the rider on the screen 22.

The use of the fore and aft motors 130, 132 allows the height of the dummy horse 10 to be controlled accurately and rapidly and also allows rapid and accurate adjustment of the inclination of the dummy horse 10 in either the fore or aft direction. The electric "roll" motor 112 situated between the upper and intermediate support plates 12a, 12b also induces side-to-side body roll in a very realistic manner. In particular, the computer can be arranged to provide a large degree of body roll if the rider is attempting to simulate a tight turn.

Moreover, operation of the slider motor 144 causes the dummy horse 10 to be displaced back and forth, which further improves the realism of the simulation.

In a preferred embodiment, the various motors described herein are all configured as servomotors which, instead of providing a continuous or discontinuous rotational movement, allow for precise control of angular position, velocity and acceleration.

Whilst the use of servomotors gives significant improvements in terms of riding simulation realism since each of the servomotors is independently operable to provide a motion that is incredibly realistic and allows a rider to develop and hone their riding, jumping and dressage styles and techniques. It is also proposed, with the present invention, to monitor the servomotor input voltage. The skilled person will appreciate that the servomotor input voltage is representative of the load being applied to the servomotor. Therefore, at any point in time, by simply monitoring one or more of the servomotor input voltages, then this can be used to provide a representation of the user's weight and position on the dummy horse. This information can be recorded and/or displayed to the rider via screen 22.

With the present invention, the servomotor input voltages can be monitored to establish the load on the motor. When the motor is supporting the framework and the body of the horse, it is subject to a normal load. That is to say that a static dummy horse with no rider seated thereon will exhibit a normal or residual voltage. The amount added in load (for example, by the rider) has to be resisted by the servomotor by increasing its voltage. It is possible to monitor this by monitoring the voltage being sent to the servomotor to keep it in place. A rider sitting on the dummy horse will increase the load therefore voltage needed to hold this position.

When the motor or motors are running, they will produce a load pattern or graph. Each movement, walk, trot, canter and gallop is a set movement that is repeated. By monitoring the rider against this graph information can be gained which can be used to check if the rider is moving with, or against, the motion.

Therefore this information can be can be used to assess:
Weight of rider
Pressure on the reins
Balance on the saddle (left, right, front and back)
Balance on the stirrups over the jumps
Pressure on the neck (balancing on the neck whilst jumping is not good)
The horse can change gait (speed up and down) by the rider's weight being transferred in the saddle The invention is not restricted to the details of foregoing embodiment.

The invention claimed is:
1. A horse riding training aid, comprising:
a dummy horse;
a first actuator configured to only adjust a fore and aft position of the dummy horse in a fore-aft direction of the dummy horse along a horizontal axis;
a second and third actuator configured to only adjust a vertical position of the dummy horse in a direction perpendicular to the fore-aft direction of the dummy horse along a vertical axis or in a vertical plane;
a control means configured to independently control the first, second and third actuator to adjust the fore, aft and vertical position of the dummy horse, thereby simulating a horse jumping, wherein the first, second, and third actuators are configured to operate independently of each other; and
a first guide means configured to constrain movement of the dummy horse in a vertical direction or in a vertical plane, wherein the first guide means is configured to restrict or prevent any pivoting or rotational movement of the dummy horse about a vertical axis such that the dummy horse is not capable of pivoting or rotational movement about a vertical axis.

2. The horse riding training aid as claimed in claim 1, further comprising a base portion, the second and third actuators extending between the base portion and the dummy horse.

3. The horse riding training aid as claimed in claim 1, further comprising resiliently deformable means for supporting at least part of a weight of the dummy horse.

4. The horse riding training aid as claimed in claim 1, wherein the dummy horse is pivotally mounted, about a fore and aft axis and further comprises a fourth actuator that pivots the dummy horse about the fore and aft axis.

5. The horse riding training aid as claimed in claim 1, further comprising:
   lower support means positioned vertically between a base portion and the dummy horse, the second and third actuators being configured to adjust a vertical position of the lower support means; and
   upper support means positioned between the lower support means and the dummy horse, the dummy horse being secured to the upper support means, a pivot to which the upper support means and the lower support means are connected and by which the upper support means is pivoted with respect to the lower support means about a horizontal axis;
   intermediate support means positioned vertically between the lower support means and the upper support means, the first actuator being configured to adjust a fore and aft position of the intermediate support means and configured for pivoting the upper support means with respect to the lower support means about a horizontal axis.

6. The horse riding training aid as claimed in claim 5, wherein the means for pivoting the upper support means with respect to the lower support means comprises an electric motor.

7. The horse riding training aid as claimed in claim 1, the dummy horse comprising:
   a body portion;
   a neck portion;
   a head portion pivotally mounted with respect to the neck portion; and
   a flexible drive means configured to pivot the head portion with respect to the neck portion.

8. The horse riding training aid as claimed in claim 7, wherein the neck portion is pivotally mounted with respect to the body portion.

9. The horse riding training aid as claimed in claim 7, wherein the flexible drive means extends between the body portion and the head portion.

10. The horse riding training aid as claimed in claim 7, further comprising stirrups connected to the body portion and sensor means for measuring a force applied to the stirrups.

11. The horse riding training aid as claimed in claim 1, the dummy horse further comprising:
   a body portion,
   a neck portion, the neck portion being pivotally mounted with respect to the body portion,
   a head portion, and
   means for pivotally turning the neck portion either left or right in response to a sensed signal.

12. The horse riding training aid as claimed in claim 11, wherein the neck portion further comprises an internal collar having a pair of opposing pivots positioned thereon.

13. The horse riding training aid as claimed in claim 12, wherein the neck portion is pivotally turned left or right around the pair of opposing pivots under control of an electric motor in response to the sensed signal.

14. The horse riding training aid as claimed in claim 13, further comprising a flexible drive means extending between the electric motor and the internal collar.

15. The horse riding training aid as claimed in claim 11, wherein the sensed signal is generated by a pair of head sensors disposed on either side of the head portion.

16. The horse riding training aid as claimed in claim 15, wherein the pair of head sensors are strain gauges that are differentially connected such that a difference signal is obtained.

17. The horse riding training aid as claimed in claim 16, wherein the difference signal controls an electric motor.

18. The horse riding training aid as claimed in claim 1, wherein at least one of the first, second and third actuators comprises an electric motor.

19. The horse riding training aid as claimed in claim 2, wherein the second and third actuators are connected to the dummy horse at locations spaced apart in the fore and aft direction.

20. The horse riding training aid as claimed in claim 4, wherein the fourth actuator operates independently of the first, second and third actuators.

21. The horse riding training aid as claimed in claim 5, wherein the second and third actuators extend between the base portion and the lower support means.

* * * * *